Jan. 22, 1957  K. THOMMEN  2,778,349
VACUUM BRAKE FOR TWO-STROKE ENGINES FOR MOTOR VEHICLES
Filed Aug. 31, 1953
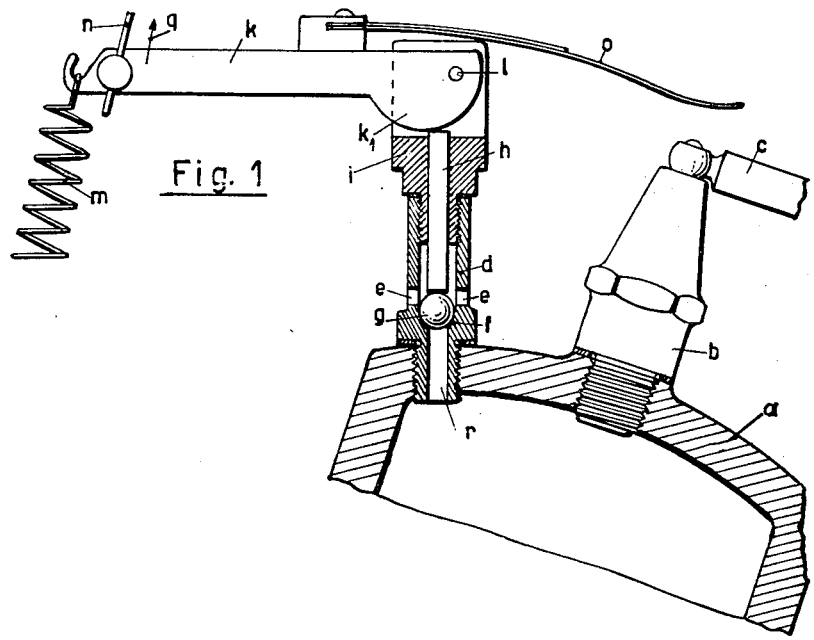
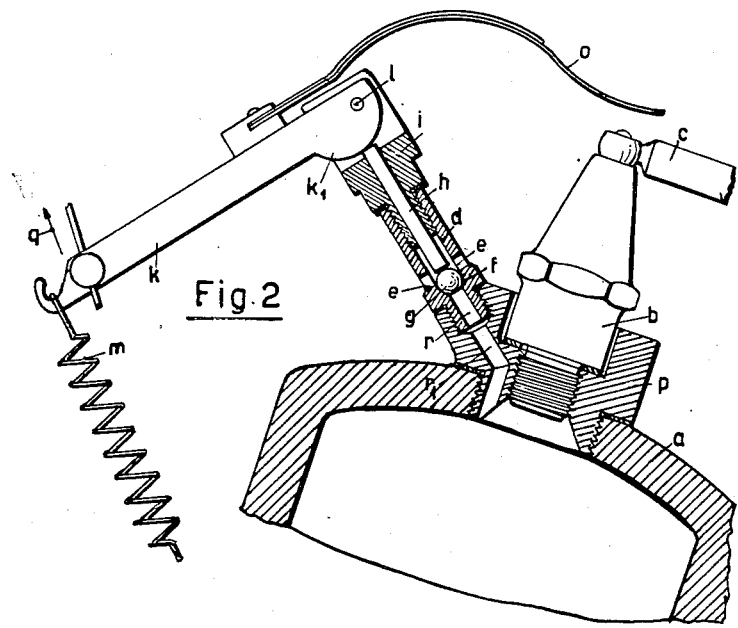
Inventor
K. Thommen ited States Patent Office 2,778,349
Patented Jan. 22, 1957

2,778,349
VACUUM BRAKE FOR TWO-STROKE ENGINES FOR MOTOR VEHICLES

Kurt Thommen, Niederdorf, Switzerland, assignor to Schneto A. G., Niederdorf, Switzerland Application August 31, 1953, Serial No. 377,655

Claims priority, application Switzerland June 9, 1953

3 Claims. (Cl. 123—97)

This invention relates to a vacuum brake for two-stroke engines for motor vehicles. The brake action of two-stroke engines is very slight as compared with that of four-stroke engines when the ignition is disconnected. Therefore, in the case of long descents, mechanical brakes are very much stressed, and they are frequently overloaded. Strong heating of the brakes takes place and the brake linings are much worn, quite apart from the fact that the wheel bearings become strongly heated, which is often connected with a great loss of grease.

The essential feature of the vacuum brake according to the invention consists in the provision of means by which a partial vacuum is produced in the interior of the cylinder and in that the ignition is short-circuited simultaneously therewith.

Examples of construction for carrying the invention into effect are illustrated in the accompanying drawing, in which:

Figure 1 is a vertical section through the engine cylinder of one example of construction; and Figure 2 is a vertical section through the engine cylinder of a second example of construction.

In the drawings, $a$ is the cylinder of the engine, $b$ the sparking plug, and $c$ the ignition cable. In order to produce a partial vacuum in the engine cylinder, its interior is closed towards the outside by a brake valve. In the examples illustrated, the brake valves operate automatically.

Referring to the example shown in Figure 1, the brake valve is arranged laterally with respect to the sparking plug, and it consists of the valve body $d$ screwed into the cylinder, and provided with air outlet openings $e$, and of the valve seat $f$, the opening of which is in communication with the interior of the cylinder through the duct $r$. On the valve seat there rests the valve ball $g$, which is held in the closed position of the valve by the locking rod $h$, which is guided in a guiding member $i$ screwed to the valve body $d$. The guiding member $i$ is longitudinally slit at the outer end for the reception of the eccentric lever $k$, which is mounted on the pin $l$ of the guiding member and abuts with its inner part $k'$, constructed as an eccentric cam, against the outer end of the locking rod $h$. The outer end of this eccentric lever $k$ is connected to a spring $m$, by means of which the lever $k$ is pressed with its part $k'$ against the end of the locking rod $h$, being also provided with a tension cable $n$. The eccentric lever $k$ is further provided with a short-circuiting contact spring $o$, the end of which away from the lever extends up to the outer end of the sparking plug.

Referring to the construction shown in Figure 2, the valve body $d$ is built into a bush $p$, which is screwed into the cylinder head, instead of the sparking plug $b$, a valve seat duct $r$ of the valve body $b$ leading to a duct $r'$ in the bush $p$, which latter duct is in communication with the interior of the cylinder; the sleeve $p$ also carries the sparking plug in such a way, that its inner end projects into the cylinder. The remainder of the construction of the brake valve is the same as in the case of the example of construction shown in Figure 1.

In order to operate the vacuum brake in the examples of construction shown in Figures 1 and 2, the cable $n$ is pulled in the direction of the arrow $q$ and is held in the new position. In this way, owing to the spring $o$ making contact with the outer end of the sparking plug, the production of an ignition spark in the interior of the cylinder is prevented by the ignition current being led to the mass, and the locking rod $h$ is allowed to move away from the ball $g$. Now, when the piston moves towards the upper dead centre position, the ball $g$ frees the valve seat, so that the contents of the cylinder can be forced out into the open atmosphere. When, thereupon, the piston reverses its direction, the passage $r$, $r'$ leading towards the interior of the cylinder is closed by the ball $g$ coming to rest on the seat $f$, whereby a vacuum is produced in the interior of the cylinder, thereby opposing considerable resistance to the descent of the piston, and thus giving rise to a braking action upon the engine and the gear, and therefore to the driven wheels. This braking effect continues until, by releasing the cable $n$ the eccentric lever $k$ again locks the rod $h$ by its eccentric-like cam $k'$, under the action of the spring $m$, and again inserts the ignition by lifting the spring $o$ off the outer end of the sparking plug.

I claim:

1. Means for braking a two-stroke internal combustion engine comprising: a duct by which the interior of the engine cylinder can communicate with the atmosphere, a valve body, formed with air-outlet apertures, screwed into the said duct, a valve seat in the valve body, a valve ball seated upon the valve seat, a locking rod capable of holding the valve ball firmly upon the valve seat, a guiding member, in which the locking rod is longitudinally slidable, secured to the valve body, means normally applying a longitudinal thrust to the outer end of the locking rod to hold the valve ball on its seat, and means for short-circuiting the engine ignition and at the same time putting out of action the means normally applying a thrust to the locking rod, the means for applying a thrust to the locking rod and the means for putting the said thrust-applying means out of action comprising: a lever fulcrumed on the guiding member and having an eccentrically curved portion which bears upon the outer end of the locking rod, a spring normally impelling the curved portion of the lever against the locking rod, and means for lifting the lever against the action of the spring to allow the ball valve to open when a braking effect is desired.

2. Means for braking a two-stroke internal combustion engine comprising: a duct by which the interior of the engine cylinder can communicate with the atmosphere, a valve body, formed with air-outlet apertures, screwed into the said duct, a valve seat in the valve body, a valve ball seated upon the valve seat, a locking rod capable of holding the valve ball firmly upon the valve seat, a guiding member, in which the locking rod is longitudinally slidable, secured to the valve body, means normally applying a longitudinal thrust to the outer end of the locking rod to hold the valve ball on its seat, and means for short-circuiting the engine ignition and at the same time putting out of action the means normally applying a thrust to the locking rod, the means for applying a thrust to the locking rod and the means for putting the said thrust-applying means out of action comprising: a lever fulcrumed on the guiding member and bearing upon the outer end of the locking rod, a spring normally impelling the lever against the locking rod, and means for lifting the lever, against the action of the spring, to allow the ball valve to open when a braking effect is desired, and the means for short-circuiting the engine ignition comprising a leaf spring secured to the said lever and adapted to come into contact with the sparking plug when the lever is lifted.

3. Means for braking a two-stroke internal combustion engine on a motor vehicle, comprising: a sleeve screwed into the head of the cylinder, a sparking plug screwed into the sleeve with its inner end projecting into the cylinder space, the sleeve being formed with a duct, a valve body, formed with air-outlet apertures, screwed into the said duct, a valve seat in the valve body, a valve ball seated upon the valve seat, a locking rod capable of holding the valve ball firmly upon the valve seat, a guiding member, in which the locking rod is longitudinally slidable, secured to the valve body, means normally applying a longitudinal thrust to the outer end of the locking rod to hold the valve ball on its seat, and means for short-circuiting the engine ignition and at the same time putting out of action the means normally applying a thrust to the locking rod.

References Cited in the file of this patent
UNITED STATES PATENTS

| | | |
|---|---|---|
| 1,161,417 | Schwerdtfeger | Nov. 23, 1915 |
| 1,278,863 | Crusius | Sept. 17, 1918 |
| 1,411,887 | Hulsmann | Apr. 4, 1922 |
| 1,514,057 | Leroy | Nov. 4, 1924 |
| 1,595,113 | Moore | Aug. 10, 1926 |
| 2,011,123 | Shilson et al. | Aug. 13, 1935 |
| 2,065,773 | Van Ranst | Dec. 29, 1936 |